Sept. 14, 1965  L. DE KRAKER ETAL  3,206,130
TOROIDAL WINDING MACHINE
Filed Jan. 18, 1963  5 Sheets-Sheet 2

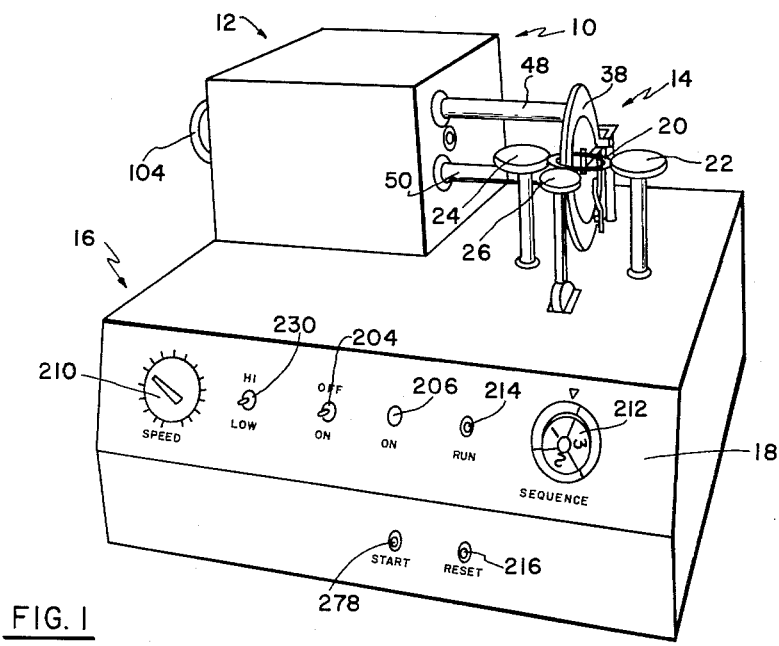
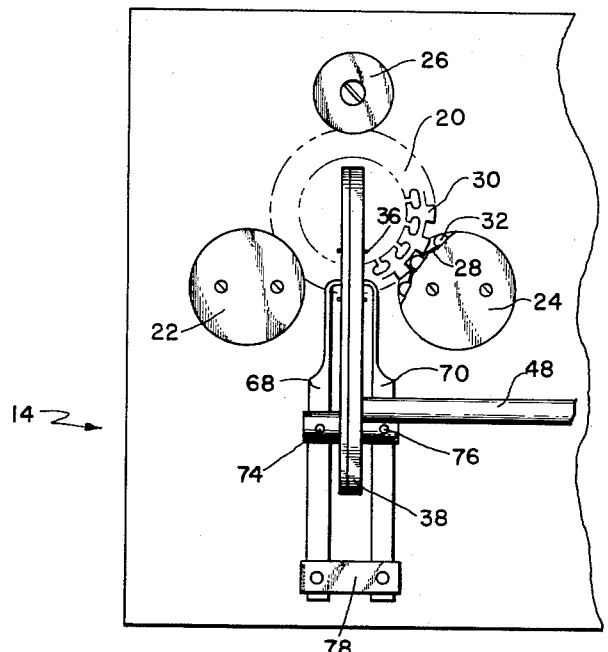

INVENTORS
LARRY DE KRAKER
MAURICE M. SIPPLE
DAN L. VE NARD
BY
Price & Heneveld
ATTORNEYS Sept. 14, 1965  L. DE KRAKER ETAL  3,206,130
TOROIDAL WINDING MACHINE
Filed Jan. 18, 1963  5 Sheets-Sheet 3

INVENTORS
LARRY DE KRAKER
MAURICE M. SIPPLE
DAN L. VE NARD
BY
Price & Heneveld
ATTORNEYS

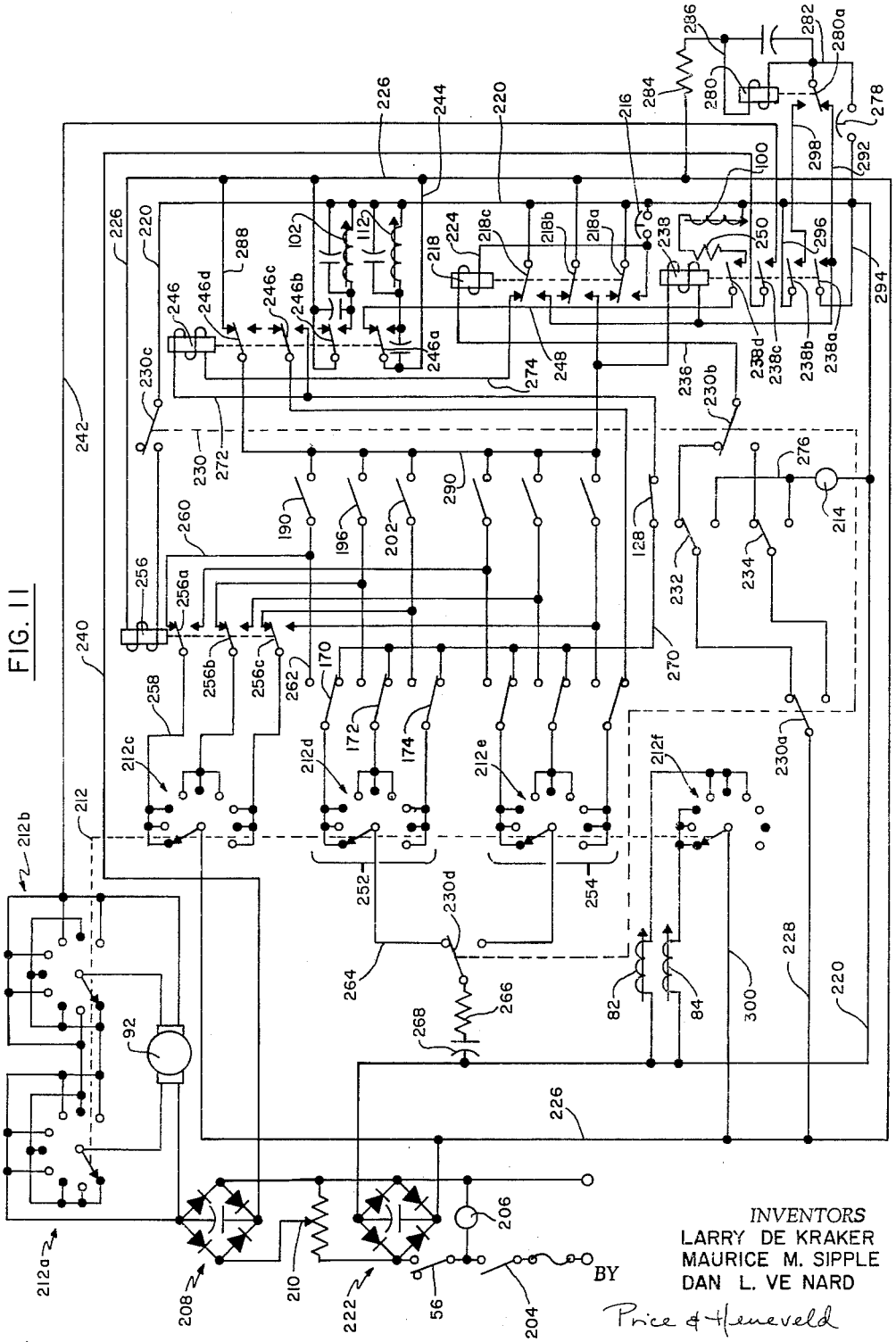

United States Patent Office 3,206,130
Patented Sept. 14, 1965

3,206,130
TOROIDAL WINDING MACHINE
Larry De Kraker, Holland, and Maurice M. Sipple and Dan L. Ve Nard, Grand Rapids, Mich., assignors to Lear Siegler, Inc.
Filed Jan. 18, 1963, Ser. No. 252,476
17 Claims. (Cl. 242—4)

This invention concerns toroidal winding machines, and more particularly an automatic machine for winding complex toroidal polyphase windings on an annular core.

In a co-pending application Serial No. 192,249 filed May 3, 1962 assigned to the assignee of the present invention, and entitled Stator Construction for High-Precision Electrical Instruments, there is disclosed a toroidally wound stator for electrical servo mechanisms in which the three phases are so wound, both in number of turns and in direction of winding, that their distribution around the stator is sinusoidal, and in which the windings of the individual phases are further so proportioned that in any one window of the annular core, the total number of turns of all three phases is constant, and that a given phase winding appears consistently in the same relative position in each window. Although the machine of this invention has many other uses, one of its primary areas of utility lies in automatically winding such stators.

The problem solved by this machine is therefore the automatic programming of the winding process in such a manner as to control, with respect to each individual window, the position of a given phase winding in the window, the number of turns in that phase winding, and the direction of winding for that phase.

The machine of this invention solves this problem by providing a bidirectionally rotatable bobbin carrier or winding shuttle encircling a window to be wound, an advancing mechanism for incrementally rotating the core about its own axis from one window to the next upon completion of a predeterminable number of turns of the bobbin carrier varying from window to window, an automatically movable guide for guiding the wire into predeterminable positions in a particular window, and incrementally switched, cam-operated turn counters for varying the number of turns of a given phase winding from window to window.

It is therefore the object of this invention to provide an automatic toroidal winding machine capable of winding a plurality of irregularly distributed phase windings onto an annular core in predeterminable relative positions and according to a predeterminable winding pattern.

These and other objects of this invention will become apparent from the following specification, taken in connection with the accompanying drawings in which:

FIG. 1 is a perspective view of the machine of this invention showing a stator core in place for winding;

FIG. 2 is a fragmentary plan view of the machine showing the winding head and its relation to the core;

FIG. 11 is an electrical diagram showing the control circuit for the device of this invention.

Figure 3:
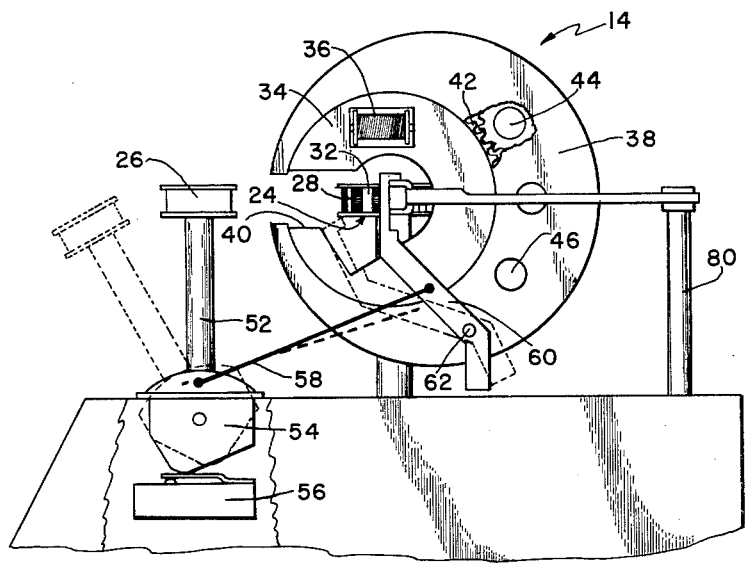
FIG. 3 is a fragmentary elevation, partly broken away, showing the construction of the winding head.

Basically, the machine automatically winds, for each phase, a given number of turns in a first window, then stops, indexes the core to the next window, winds a different number of turns as commanded by the indexing cam, and so forth until an entire winding section is wound. The machine then automatically stops to permit the operator to switch it to the next winding section. At the end of each phase, the stop feature further allows the operator to pull a wire loop so as to enable the individual phase windings to be subsequently connected to the electrical circuitry of the apparatus for which they are intended.

In the event of a malfunction, a faultily wound core can be removed from the machine, and the machine can then be automatically reset to starting position regardless of its position at the time the malfunction occurred.

General construction

Referring now to the drawings, FIG. 1 shows the machine of this invention generally at 10. The machine has a driving mechanism 12, a winding head 14, and a case 16 containing the control panel 18 and housing the control mechanism.

FIGS. 2 and 3 show the winding head 14 in detail. For clarity, the stator or core 20 being wound is shown in FIG. 2 but not in FIG. 3. It will be seen that the core 20 is held in winding position between a pair of index wheels 22, 24 and the spring-loaded retainer wheel 26. The core 20 can be rotated about its own axis by rotation of the index wheels 22, 24 whose pins 32 protruding from the surface 28 fit into the space between the teeth 30 of the core 20. Thus, the engagement between index wheels 22, 24 and the core 20 is gear-like, and the rotation of the core 20 can be accurately controlled by controlling the rotation of the index wheels 22, 24.

The winding is accomplished by a shuttle 34 carrying a bobbin 36 of wire. The shuttle 34 takes the form of a disc which, like its housing 38, is crescent-shaped so as to provide a gap 40 through which the core 20 can be inserted into the machine. The perimeter of the shuttle 34 is provided with teeth 42 which engage pinions 44, 46. These pinions are the shuttle drive pinions, and two pinions are provided so that the shuttle will be driven at all times even when the gap 40 is opposite one of the drive pinions. The drive pinions 44, 46 receive their driving power from the driving mechanism 12 through shafts 48, 50.

In order to enable the operator to insert the core into the winding head 14, the retaining wheel 26 and its post 52 may be pivoted about cam 54 to an out-of-the-way position shown in dotted lines in FIG. 3. A safety switch 56 is actuated by the cam 54 in such a manner as to prevent the machine from operating unless the retaining wheel 26 is in the full line position of FIG. 3. A linkage 58 connects the cam 54 to the inner wire guide 60 to cause it to swing about its pivot 62 in unison with the retaining wheel 26 so as to be moved to an out-of-the-way position simultaneously with retaining wheel 26.

Figure 4:
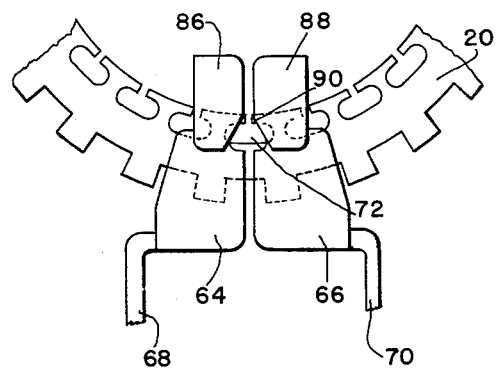
FIG. 4 is an enlarged fragmentary plan view of the wire guides showing their relation to the core being wound.

The function of the wire guides is shown more explicitly in FIG. 4. In that figure, the outer wire guides 64, 66 mounted at the ends of pivot arms 68, 70 (see also FIG. 2) are centered with respect to the winding window 72 of the core 20. Referring to FIG. 2, it will be seen that the pivot arms 68, 70 are pivoted at points 74, 76 respectively. At the ends opposite the wire guides 64, 66, the arms 68, 70 are tied together by a bridge 78 which in turn is mounted to a pivotable post. The post 80 is biased into its vertical position by appropriate biasing means (not shown) but can be pivoted either to the right or to the left in FIG. 2 by the winding guide solenoids diagrammatically shown at 82, 84 in FIG. 11. The pivoting of post 80 under the effect of the solenoids 82, 84 moves the bridge 78 to the left or right in FIG. 2, and consequently the outer wire guides 64, 66 are moved to the right or left in FIG. 4. The heads 86, 88 of the inner wire guide 60 remain stationary when the outer wire guides move, so that the wire is always guided accurately through the gap 90 of the core regardless of the positioning of the wire within the window 72.

Figure 5:
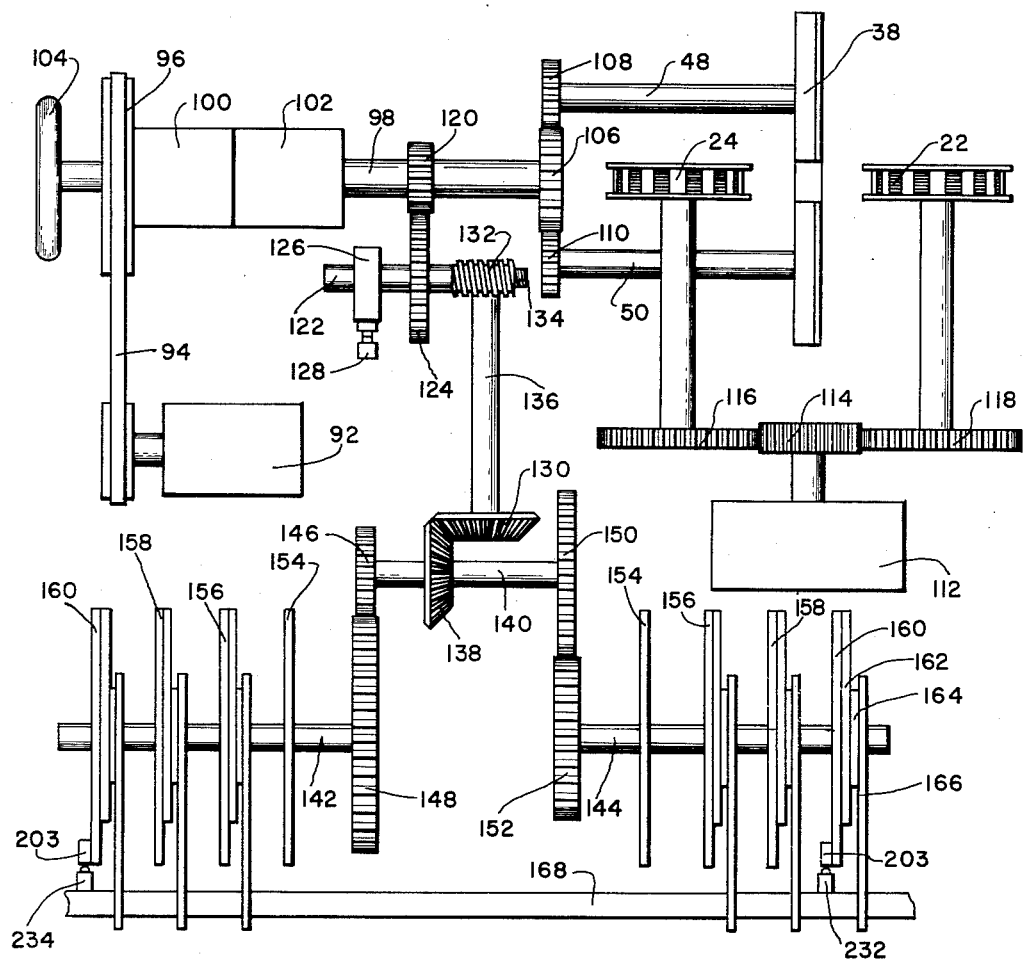
FIG. 5 is a motion flow diagram showing the mechanical interconnection of the various parts of the device.

FIG. 5 shows the motion flow diagram of the apparatus. The machine 10 is driven by a reversible D. C. motor 92, whose motion is transmitted through belt 94 to drive pulley 96. Drive pulley 96 is connected to the drive shaft 98 through the intermediary of an electric clutch 100. An electric brake 102 is arranged to act on the drive shaft 98. A hand wheel 104 is attached to the drive shaft 98 to manually turn it when necessary.

A bull gear 106 mounted to the drive shaft 98 drives a pair of identical pinions 108, 110 in the same direction and at the same speed. The pinions 108, 110 in turn drive the shafts 48, 50 which power the shuttle as hereinbefore described. The index wheels 22, 24 are rotated by finite, discrete increments by a solenoid-actuated ratchet mechanism 112 through the intermediary of a pinion 114 and gears 116, 118.

A pinion 120 on drive shaft 98 drives a cam shaft 122 through the intermediary of gear 124. The cam shaft 122 carries a cam 126 acting in conjunction with a switch 128 to close the circuit of switch 128 whenever the shuttle 34 is precisely in the position shown in FIG. 3. The cam shaft 122 drives bevel gear 130 through the intermediary of a worm gear train 132, 134 and shaft 136. The bevel gear 130 in turn drives bevel gear 138 on shaft 140. The motion of shaft 140 is transmitted to cam shafts 142 and 144, respectively, through gear trains 146, 148 and 150, 152. The two last-mentioned gear trains are of different ratios, determined by the total number of turns per phase to be wound, in such a manner that the cam shaft 142 makes two complete revolutions while the shuttle 34 makes as many revolutions as there are turns in one complete phase for one type of stator to be manufactured on the machine; and cam shaft 144 makes two complete revolutions while the shuttle 34 makes as many revolutions as there are turns in one complete phase for another type of stator to be manufactured on the machine.

On each of the cam shafts 142, 144, cam 154 is the indexing cam for the particular "stack" (i.e. type of stator) associated with its cam shaft. Cams 156, 158, and 160 on each cam shaft are the stop cams for phase 1, phase 2, and phase 3, respectively. Each of the stop cams is equipped with a bridging disc 162 cooperating with a friction plate 164 and an anchor member 166 for a purpose described hereafter in more detail in connection with FIGS. 7 through 10. The anchor members 166 are all anchored on a fixed reference bar 168.

*Index and stop cams*

Figure 6:
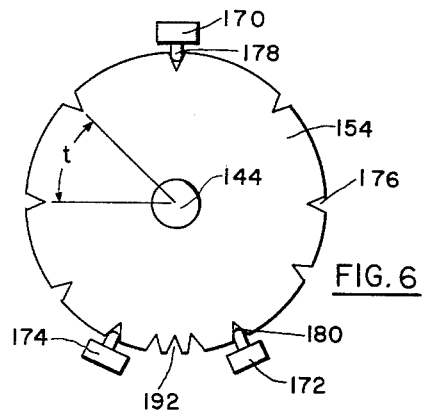
FIG. 6 is an elevation of a typical indexing cam used in the machine of this invention.

FIG. 6 shows a typical index cam 154. As indicated in FIG. 6, three index switches 170, 172, and 174 are disposed around the circumference of the indexing cam 154. The switches 170 through 174 are arranged to move between a counting position (up in FIG. 11) when their sensing element is riding on the rim of the cam 154 and an indexing position (down in FIG. 11) when their sensing element drops into one of the notches 176. As will be brought out in more detail hereinafter, the purpose of the indexing switches 170 through 174 is to rotate the core from one window to the next each time a sufficient number of turns has been wound in a given window. It will be recalled that the indexing cam 154 turns at an angular velocity such that it makes two complete revolutions whenever the shuttle makes as many revolutions as a phase has turns. Because of this proportional synchronous movement, it will be seen that the length of any arc such as *t* on cam 154 between two adjacent notches 176 corresponds to the number of turns to be wound in a given window.

In order to preserve the symmetry of the stator, its three phase windings are identical but displaced 120° from each other along the circumference of the stator. Noting now that the indexing cam 154 has twelve notches 176, it will be evident that the stator will index twenty-four times for each phase winding; i.e. the stator to be wound by the use of the cam 154 has twenty-four windows. If it is now assumed that notch 178 in FIG. 6 corresponds to the beginning of phase 1, then the stator will have to index eight times in order to reach the window in which the beginning of phase 2 lies. Assuming that the cam 154 rotates clockwise, this would occur when notch 180 reaches indexing switch 170. At that moment, notch 178 is in register with indexing switch 172. Eight further indexing operations will bring notch 178 in front of indexing switch 174, which thus corresponds to the beginning of phase 3.

Figure 7:
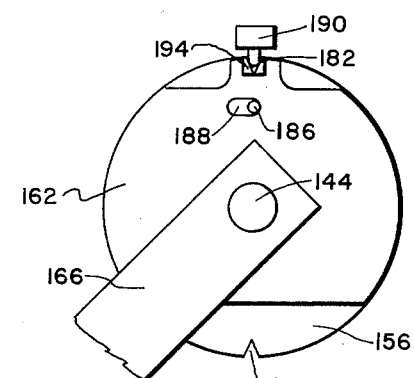
FIG. 7 is an elevation of the stop cam and bridging disc for phase 1 matching the indexing cam of FIG. 6.
Figure 8:
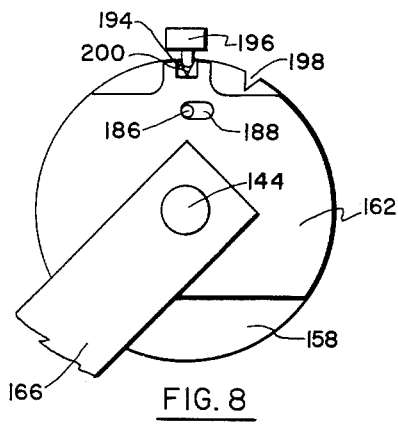
FIG. 8 is an elevation of the stop cam and bridging disc for phase 2 matching the indexing cam of FIG. 6.

Referring now to FIG. 7, it will be seen that stop cam 156 has two notches 182, 184. A bridging disc 162 is mounted against the stop cam 156 for limited rotational movement with respect thereto. On its opposite face, the bridging disc 162 engages a friction plate 164 (FIG. 10) of cork or other material having a high coefficient of friction. The opposite side of the friction plate 164 engages the anchor member 166 which is fixed. As a result, the bridging disc 162 will not move unless it is carried with the stop cam 156 by engagement of the pin 186 with an end of slot 188. Assuming now that the stop cam 156 is initially in the position shown in FIG. 7, with stop switch 190 resting in notch 182, it will be seen that when stop cam 156 begins its clockwise movement in unison with index cam 154 (FIG. 6), stop switch 190 will close as it rides up onto the rim of stop cam 156 and will remain closed until indexing switch 170 reaches notch 192 and stop switch 190 simultaneously drops into notch 184. During this motion of the cams, six windows of the stator have been wound, the first two with a large number of turns, and the next following ones with progressively less turns until only very few turns were wound in the sixth. The six windows wound so far amount to one fourth of the total number of windows in the stator, and consequently one quarter of phase 1 has now been wound.

As will be explained hereinafter in connection with FIG. 11, the winding direction is now reversed. This causes the cams to turn backwards. The winding process now repeats itself in a negative winding direction, starting with very few turns in the first window, and then progressively more and more until notch 178 again reaches indexing switch 170. At this point, stop switch 190 is once again in alignment with notch 182 on stop cam 156. However, the counterclockwise rotation of stop cam 156 has in the meanwhile caused the pin 186 to move to the other end of slot 188, and the notch 194 in bridging disc 162 is no longer in register with the notch 182. The stop switch 190 therefore cannot drop into notch 182, and the machine continues to run until the stop switch 190 once again reaches notch 184. When this happens, the cams have completed one complete revolution, and the machine has thus produced the entire negatively wound half of the phase 1 winding.

The operator now reverses the winding direction once again, and the cams once again turn clockwise. The clockwise rotation of stop cam 156 once again brings notch 194 of bridging disc 162 into register with notch 182 of stop cam 156, and the stop switch 190 opens when it reaches notch 182. During this last clockwise half revolution of the cams, the winding head has wound the final quarter of the phase 1 winding in the positive direction. Indexing switch 170 during this time has made a grand total of twenty-four indexing operations, and consequently the stator, as well as the cams, is back in its original starting position.

The operator now switches the control of the operation for phase 2 to indexing switch 172 and stop switch 196 on stop cam 158. In the same manner as previously discussed, the machine winds two windows relatively until indexing switch 172 reaches notch 192 and stop switch 196 reaches notch 198 on stop cam 158. The winding direction is now reversed, and this causes bridging disc 162 to cover notch 200 on stop cam 158. The device therefore does not stop until stop switch 196 once again reaches notch 198, and on the subsequent reversal of winding direction, the bridging disc 162 once again enables stop switch 196 to drop into notch 200 and terminate the winding of the second phase when all the cams and the stator are back in their original positions.

Figure 9:
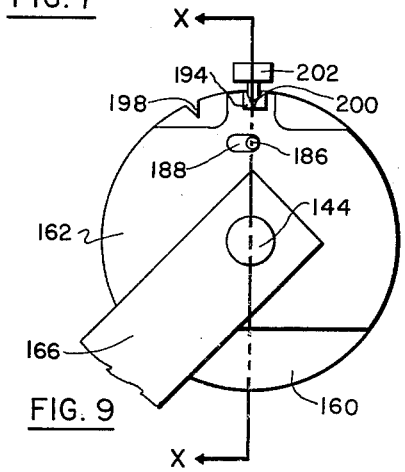
FIG. 9 is an elevation of the stop cam and bridging disc for phase 3 matching the indexing cam of FIG. 6.
Figure 10:
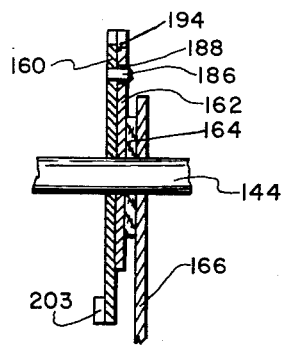
FIG. 10 is a vertical section along line X—X of FIG. 9.

Likewise, phase 3 is wound by the interaction of indexing switch 174 and stop switch 202 on stop cam 160 (FIG. 9).

Protrusion 203 (FIG. 5) on stop cam 160 of cam shaft 144 actuates switch 232 when the cams on cam shaft 144 are in their starting position. Likewise, protrusion 203 on stop cam 160 of cam shaft 142 actuates switch 234 when the cams on cam shaft 142 are in their starting position. Switches 232, 234 are associated with the resetting mechanism described hereinbelow.

*Electrical circuitry*

The operation of the machine 10 can best be understood from a consideration of FIG. 11, in which all relays are shown in their de-energized or released condition. The machine is turned on by closing the master switch 204. The pilot light 206 thereupon lights, indicating that the machine is energized. However, the machine cannot yet operate because safety switch 56 (FIG. 3) is open. When a core 20 is inserted in the winding head 14 and locked into position by the retaining wheel 26, the safety switch 56 closes and supplies power to the circuits of the machine. A rectifier circuit 208 provides the D.C. power supply for the motor 92. The input voltage to the rectifier circuit 208 can be regulated by the speed control 210. The direction of rotation of the motor 92 is controlled by the motor reversing decks 212a and 212b of the sequence switch 212. (In the diagram of FIG. 11, the positions of sequence switch 212 indicated by a black dot indicate a motor connection for forward rotation, whereas the switch positions indicated by a white dot correspond to reverse rotation of the motor 92).

Before beginning operation of the machine, the operator must observe the run light 214. If it is not lit, the cams are not in the starting position. The operator thereupon presses reset button 216. This causes energization of reset relay 218 from the negative bus 220 of rectifier circuit 222 through reset button 216 and wire 224, and from the positive bus 226 of rectifier circuit 222 through wire 228, section 230a of the high-low or stack selector switch 230, switch 232 or 234 (depending on the position of high-low switch 230), section 230b of high-low switch 230, and wire 236 to relay 218. Contacts 218a of relay 218 lock the reset relay 218 in, permitting button 216 to be released. Contact 218b of relay 218 energizes the motor relay 238 which energizes motor 92 through its section 238c which connects the positive motor bus 240 to wire 242. The return path from motor relay 238 to the negative bus 220 is provided in this condition by contact 218c of the reset relay 218. Clutch 100 is engaged upon energization of motor relay 238 from positive bus 226 through wire 244, contact 246a of index relay 246, wire 248, contact 238d of motor relay 238, and limiting resistor 250. Motor 92 now runs in whatever direction happens to be set on the sequence switch 212 until all cams reach their starting position as determined by either switch 232 or switch 234, depending on the position of high-low switch 230.

In the center of FIG. 11, the switch group generally designated as 252 and including switches 212d, 170, 172, 174, 190, 196, and 202 is associated with the cams of one of the cam shafts 142 or 144, and the switch group 254 is associated with the other for like functions. The selection between the two switch groups 252, 254 is accomplished by section 230c of high-low switch 230 which operates the stack selector relay 256. As will be readily seen from FIG. 11, relay 256 in its released position connects the stop cam selector deck 212c of the sequence switch 212 to the switches of group 252, whereas in its energized position, it connects the deck 212c to the switch group 254.

While the motor 92 was returning to its starting position, the rotation of cam 154 caused all three of switches 170, 172 and 174 to go through periods in which they were in their upper position in FIG. 11, corresponding to the counting intervals between notches on cam 154. During these intervals, the following circuit was established, assuming the sequence switch 212 to be in the position shown in FIG. 11: from the positive bus 226 through stop cam selector deck 212c, wire 258, contact 256a of stack selector relay 256, wire 260, wire 262, switch 170, deck 212d of switch 212, wire 264, section 230d of high-low switch 230 and charging current limiting resistor 266 to capacitor 268. The other side of capacitor 268 is connected to the negative bus 220. This circuit results in placing a charge on capacitor 268. When the cams now reach their starting position, switch 170 drops into notch 178 (FIG. 6), which corresponds to the lower position of switch 170 shown in FIG. 11. The capacitor 268 is thus disconnected from the positive voltage source by switch 170 and is instead connected to wire 270. As soon as the switch 128 closes (and it will be recalled that it does so only when the shuttle is in the position shown in FIG. 3), index relay 246 is energized by the discharge of capacitor 268 through wire 270, switch 128, wire 272, the coil of index relay 246, wire 274, contact 218c of reset relay 218 (which has in the meanwhile been released by the opening of switch 232) to the negative bus 220.

The energization of index relay 246 opens the only remaining positive supply to the motor relay 238 at contact 246d (switches 190, 196, and 202 are all open when the cams are in the starting position) so that the motor relay 238 releases and the motor 92 stops. Simultaneously, contact 246b of index relay 246 applies to brake 102 to stop the shuttle 34, and contact 246a of index relay 246 operates the index ratchet 112. Contact 246c is a lock-in contact which bypasses switch 128 and holds the index relay 246 in its energized condition until the discharge of capacitor 268 has progressed to the point where it is no longer able to hold the indexing relay 246.

The period of energization of index relay 246 dictated by capacitor 268 and the resistance of the coil of index relay 246 can be very short, as it is only necessary to give the index ratchet time to operate properly to rotate the core 20 from one window to the next before the winding of the next window starts.

The machine is now stopped and is ready to operate as indicated by lighting of the "run" light 214 as a result of its energization through wire 228, section 230a of switch 230, switch 232, and wire 276. The operator is now in a position to thread the core and, having done so, depress the start button 278. This energizes run relay 280 from negative bus 220 through wire 282 and from positive bus 226 through limiting resistor 284 and wire 286. Due to the release of index relay 246, the positive supply for the motor relay 238 is again established from the positive bus 226 through wire 288, contact 246d of index relay 246, and wire 290. Consequently, the depressing of start button 278 provides the negative supply for motor relay 238 through wire 282, contact 280a of run relay 280, and wire 292. The energization of motor relay 238 starts the motor and also locks the motor relay 238 in by closing its contact 238a which is connected to negative bus 220 by wire 294. The simultaneous energization of motor relay 238 and run relay 280 locks the run relay 280 in by providing its negative supply from bus 220 through wire 296, contact 238b of motor relay 238, wire 298, and the contact 280a of run relay 280.

As the motor 92 runs, switch 170 once again moves to its upper position in FIG. 11. Capacitor 268 consequently recharges, and the device is then ready for an indexing operation. When cam 154 has turned sufficiently for switch 170 to drop into the next notch, switch 170 moves to the lower position in which it is shown in FIG. 11. As previously described, this results in energization of the index relay 246 as soon as the shuttle is in the position of FIG. 3. This time, however, the motor relay 238 is not released by the energization of index relay 246 because switch 190 is closed at this time and supplies current to the motor relay 238 through wire 260 and wire 290. The energization of index relay 246 does, however, disengage clutch 100 by the action of contact 246a of index relay 246. This allows stopping of the shuttle by brake 102 in spite of the fact that the motor 92 continues to run. The operation of contact 246a also causes the index ratchet 112 to advance the core 20 by one window. As soon as the indexing pause capacitor 268 is sufficiently discharged, index relay 246 releases again, and contact 246a reengages the clutch 100 while contact 246b releases the brake 102. The shuttle 34 now resumes its rotation and continues to wind the second window for the number of turns determined by the length of arc t of cam 154 (FIG. 6). The indexing operation is then repeated.

When the winding of the first phase has progressed to the point where a reversal of the winding direction is indicated, switch 190 drops into notch 184 on cam 156 (FIG. 7) and opens. Now the circuit of motor relay 238 is no longer maintained, and when the energization of index relay 246 now opens contact 246d, motor relay drops out. The consequent opening of contact 238b of motor relay 238 also releases the run relay 280. The machine now stops and awaits the action of the operator in setting sequence switch 212 to the next winding increment and depressing the start button 278 again upon having assured himself that the wire is positioning itself properly on the core 20 at the point of direction reversal and having taken any corrective measures which might be necessary. It will be remembered, of course, that when switch 212 is set to the next winding increment, the direction of rotation of the motor 92 will be reversed.

Wire guide position selector deck 212f of sequence switch 212 energizes winding guide solenoid 82 in all phase 1 positions of the sequence switch 212, wire guide solenoid 84 in all phase 2 positions, and neither in the phase 3 positions. The center contact of deck 212f is connected to the positive bus 226 by wire 300.

*Operation*

The machine 10 is turned on by closing the master switch 204. A raw core 20 is then inserted in the indexing wheels 22, 24, and the retainer wheel 26 is swung into place to lock the core 20 in position. This movement simultaneously positions the inner wire guide 60. If the "run" light 214 is not lit, the reset button 216 is first pressed. The reset relay 218 thereupon actuates the motor 92 to turn all the cams to their starting position for the type of core to be wound, as evidenced by the selection made on the high-low switch 230. When the cams have reached the starting position, the "run" light 214 lights. The operator now applies the end of the wire from the bobbin 36 to the core 20, leaving a pigtail for eventual connection of the finished stator to the equipment for which it is intended. The sequence switch is now set to its first position shown in FIG. 11 (run 1 of phase 1). This positions the outer wire guide to the phase 1 position. The winding is now started by hand by use of the hand wheel 104 until the wire has properly caught on the core, and the operator then depresses the start button 278.

The closing of start button 278 energizes run relay 280, which in turn energizes motor relay 238. The clutch 100 now engages and the shuttle and cams begin to rotate. The indexing pause capacitor 268 charges as instantaneously as the limiting resistor 266 will permit through the indexing switch 170, and the motor continues to run until the indexing switch 170 hits the first notch on cam 154. As soon thereafter as the shuttle has reached its rest position of FIG. 3, the indexing relay disengages the clutch 100, applies the brake 102, and moves the core forward one window. After a short pause, the brake 102 releases and the clutch 100 reengages when index relay 246 drops out. The process now repeats itself over and over until the stop switch 190 opens. This time the actuation of index relay 246 causes motor relay 238 and run relay 280 to drop out, and the motor stops. The operator now checks the winding and sets the sequence switch to the next position, i.e. run 2 of phase 1. He then depresses the start button 278 again, and the machine resumes its operation.

At the end of run 3 of phase 1, the operator manually pulls a loop of wire to provide pigtails at the end of phase 1 and at the beginning of phase 2 for eventual connection to appropriate apparatus. It will be noted that at the end of run 3 of each phase, the core 20 is always back to its starting position; hence, all pigtails appear at the same window.

By now setting the sequence switch 212 to run 1 of phase 2, the outer wire guides 64, 66 are automatically moved over by the action of deck 212f to wind phase 2 on the other side of the windows. In like manner, the operator pulls a loop at the end of phase 2. By then setting the sequence switch 212 to run 1 of phase 3, the outer wire guides go to the center position and wind phase 3 in the center of the windows. At the end of run 3 of phase 3, the operator pulls enough wire to form a pigtail and then cuts the wire and removes the finished stator from the winding head 14 by swinging the retainer wheel 26 out of the way and taking the finished stator out.

It will be seen that the present invention provides a versatile and effective automatic machine for winding complex multiphase toroidal windings with a speed and accuracy unobtainable by hand operation. Obviously, the teachings of the invention can be carried out in many different ways, of which the embodiment shown and described herein is merely illustrative. Therefore, we do not desire the invention to be limited by the embodiment shown and described, but rather only by the scope of the following claims.

We claim:

1. A machine for winding complex toroidal windings on an annular core having a plurality of windows, comprising: a generally annular rotatable shuttle for carrying a bobbin of wire; support means for supporting said core in interlacing relation to said shuttle; means for incrementally rotating said core; drive means for rotating said shuttle; and automatic means for varying during one rotation of said core the number of revolutions of said shuttle between predetermined incremental portions of said rotation of said core in accordance with a predetermined pattern to produce during said one rotation a core having a varying number of windings in its windows.

2. A machine for winding complex toroidal windings on an annular core having a plurality of windows, comprising: a generally annular rotatable shuttle for carrying a bobbin of wire; support means for supporting said core in interlacing relation to said shuttle; means for incrementally rotating said core; reversible drive means for rotating said shuttle; and automatic means for varying during one rotation of said core the number of revolutions and direction of rotation of said shuttle between predetermined incremental portions of said rotation of said core in accordance with a predetermined pattern to produce during said one rotation a core having a varying number of windings in its windows.

3. A machine for winding complex toroidal windings on an annular core, comprising: a generally annular rotatable shuttle for carrying a bobbin of wire; support means for supporting said core in interlacing relation to said shuttle; means for incrementally rotating said core; drive means for rotating said shuttle; said core having a plurality of discrete winding windows; and wire guide means selectively positionable in a plurality of positions to cause said wire to be wound in a selectable portion of each of said windows.

4. A machine for winding complex toroidal windings on an annular core, comprising: a generally annular rotatable shuttle for carrying a bobbin of wire; support means including a plurality of support elements for supporting said core at a plurality of points in interlacing relation to said shuttle; means for incrementally rotating said core; drive means for rotating said shuttle; and means for preventing operation of said drive means unless all of said support elements are in engagement with said core.

5. In a winding machine capable of bidirectional operation and having a cam driven in synchronism with the winding operation and notched to actuate switch means for controlling the number of turns to be wound in a given a direction, a unidirectional cam disabling mechanism comprising: a bridging member in relatively low-friction engagement with said cam and relatively high-friction engagement with stationary refernce means; said bridging member being capable of limited movement relative to said cam and unlimited movement relative to said reference means; said bridging member being actuated by the rotation of said cam to move into and out of bridging relationship with a portion of said cam depending on the direction of said rotation.

6. In a winding machine capable of bidirectional operation having cam means driven in synchronism with the winding operation and notched to actuate switch means for controlling the number of turns to be wound in a given direction, a unidirectional cam disabling mechanism comprising: a bridging member disposed coaxially with said cam means adjacent thereto in frictional contact therewith and having a rim portion of substantially the same radius as said cam means and a notch portion alignable with said notch; means permitting limited relative angular movement between said cam means and said bridging member; a fixed anchor member; and friction clutch means interposed between said anchor member and said bridging member so as to cause said bridging member to rotate into a position where said rim portion bridges said notch when said cam means rotate in one direction, and into a position where said notch portion and notch are aligned when said cam means rotate in the other direction.

7. A winding machine for producing a plurality of complexly distributed toroidal phase windings from a single continuous piece of wire, comprising: a winding shuttle; an indexing cam; and a plurality of stop cams; a plurality of indexing switches associated with said indexing cam; said stop cams each having a pair of stop elements; means for rendering one of said stop elements on each stop cam inoperative only when said stop cam rotates in a predetermined direction; and a stop switch associated with each of said stop cams for actuation by its stop elements.

8. A winding machine for producing a plurality of complexly distributed toroidal phase windings composed of symmetrical halves wound in opposite directions and displaced from one another along an annular core having a plurality of windows, from a single continuous piece of wire, comprising: a winding shuttle; an indexing cam; and a plurality of stop cams, one for each said phase winding; means connecting said shuttle and said cams so geared as to cause said shuttle to make as many revolutions as there are turns in each phase winding for every two revolutions of said cams; said indexing cam having half as many indexing elements as there are windows in said core; said indexing elements being distributed about said indexing cam at intervals corresponding to the distribution increments of said phase winding halves; a plurality of indexing switches associated with said indexing cam and displaced from one another by arcs corresponding to the sum of the intervals associated with a number of indexing elements equal to the number of windows by which said phase windings are displaced from one another; said stop cams each having a pair of stop elements displaced from one another by a predetermined arc; means for rendering one of said stop elements on each stop cam inoperative only when said stop cam rotates in a predetermined direction; a stop switch associated with each of said stop cams for actuation by its stop elements; and means for reversing the direction of rotation of said shuttle and cams following each actuation of the stop switch associated with the phase being wound.

9. A machine for winding multiphase toroidal windings onto a core, comprising: a winding shuttle; drive means for driving said shuttle; indexing means for rotating said core by discrete increments; cam-operated switch means for operating said indexing means after predetermined numbers of revolutions of said winding shuttle; means interconnected between said cam-operated switch means and said indexing means for disengaging said shuttle from said drive means and stopping said shuttle in a predetermined position during the indexing operation; and timing means for causing said last-named means to re-engage said winding shuttle with said drive means after a predetermined time interval sufficient to complete said indexing operation.

10. The machine of claim 9, further comprising means for stopping said drive means following predetermined numbers of indexing operation.

11. The machine of claim 10, in which said drive-means-stopping means comprise cam-operated switch means.

12. The machine of claim 9, further comprising reset means for actuating said drive means to automatically return the cams operating said switch means to a predetermined starting position regardless of the condition of the apparatus when said reset means are actuated.

13. The machine of claim 9, in which said timing means include a capacitor, and said means interconnected between said cam-operated switch and said indexing means include relay means for energizing said indexing means and disengaging said winding shuttle from said drive means, said relay means being energized for a predetermined interval following operation of said cam-operated switch by the discharge of said capacitor.

14. The machine of claim 13, further comprising switch means operated in synchronism with the rotation of said shuttle and connected between said capacitor and said relay means to prevent energization of said relay means unless said shuttle is in a predetermined position.

15. The machine of claim 9, in which said core is held in winding position by a movable support member, further comprising safety switch means operated by said support member to disable said machine when said support member is out of its core-engaging position.

16. A machine for winding complex toroidal windings on an annular core, comprising: a generally annular rotatable shuttle for carrying a bobbin of wire; support means for supporting said core in interlacing relation to said shuttle; means for incrementally rotating said core; drive means for rotating said shuttle; and automatic means for selectively controlling the number of revolutions of said shuttle between each incremental rotation of said core in accordance with a predetermined pattern, said means for controlling the number of revolutions of said shuttle between each incremental rotation of said core including switch means actuated by a notched cam driven in synchronism with the rotation of said shuttle; a bridging member in relatively low-friction engagement with said cam and relatively high-friction engagement with stationary reference means; said bridging member being capable of limited movement relative to said cam and unlimited movement relative to said reference means; said bridging member being actuated by the rotation of said cam to move into and out of bridging relationship with a portion of said cam depending on the direction of said rotation.

17. A machine for winding complex toroidal windings on an annular core, comprising: a generally annular rotatable shuttle for carrying a bobbin of wire; support means for supporting said core in interlacing relation to said shuttle; means for incrementally rotating said core; drive means for rotating said shuttle; and automatic means for selectively controlling the number of revolutions of said shuttle between each incremental rotation of said core in accordance with a predetermined pattern; said means for controlling the number of revolutions of said shuttle between each incremental rotation of said core including switch means actuated by a notched cam driven in synchronism with the rotation of said shuttle; and a mechanism for disabling the cam in one direction of rotation including a bridging means and means actuated by the rotation of said cam for moving said bridging member into and out of bridging relationship with a portion of said cam depending on the direction of said rotation.

References Cited by the Examiner

UNITED STATES PATENTS

| | | | |
|---|---|---|---|
| 1,053,962 | 2/13 | Alexander | 242—5 |
| 2,517,142 | 8/50 | Staley | 74—567 |
| 3,048,053 | 8/62 | Howe | 74—567 |
| 3,061,213 | 10/62 | Gorman | 242—4 |
| 3,104,840 | 9/63 | Post et al. | 242—4 |
| 3,110,194 | 11/63 | Roman | 74—567 |
| 3,125,307 | 3/64 | Buralli | 242—4 |

MERVIN STEIN, *Primary Examiner.*